June 7, 1955
J. E. SHEPHERD ET AL
2,710,399
RADAR LOCATING APPARATUS
Original Filed April 30, 1942
4 Sheets-Sheet 3
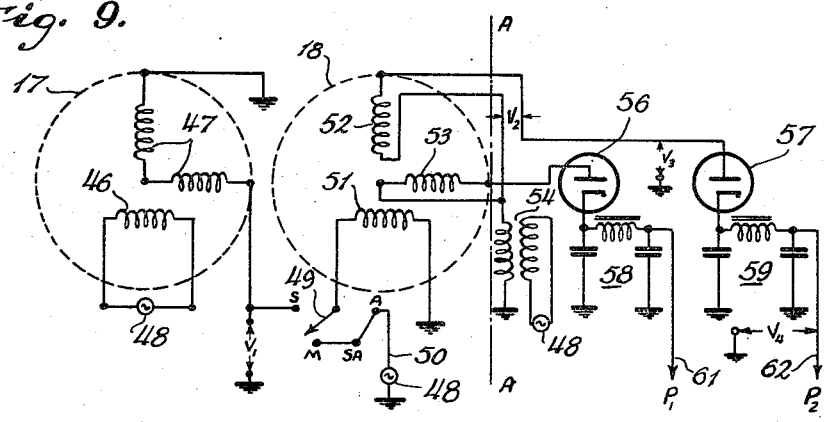
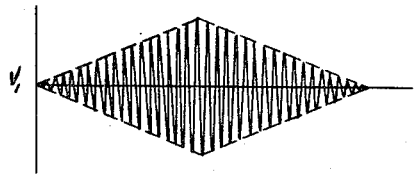
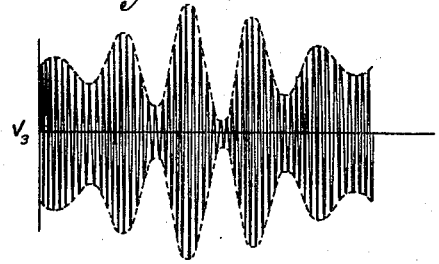
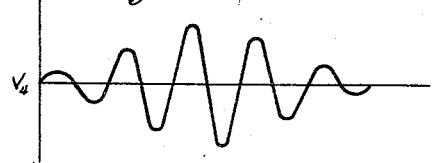
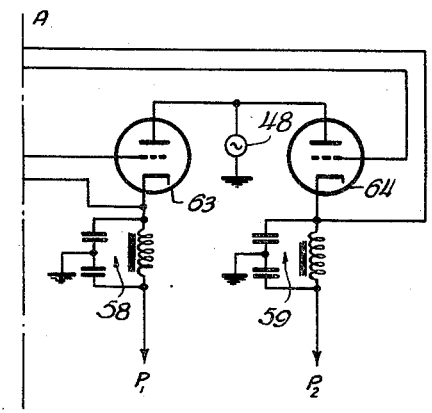
INVENTORS
J. E. SHEPHERD, W. W. MIEHER,
AND G. E. WHITE.
BY
Paul B. Hunter
ATTORNEY.

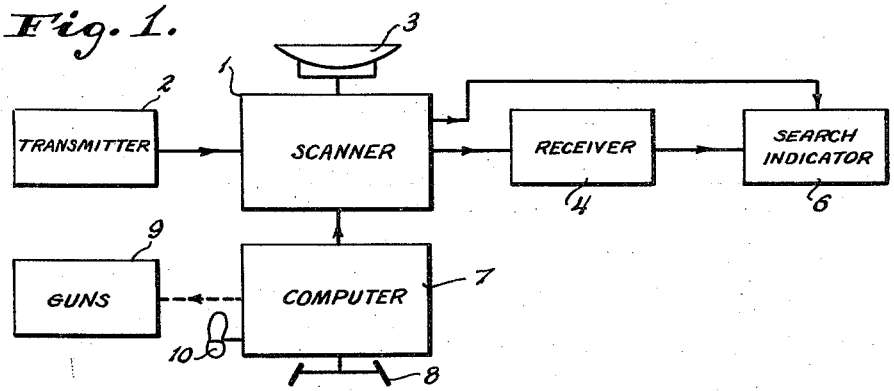
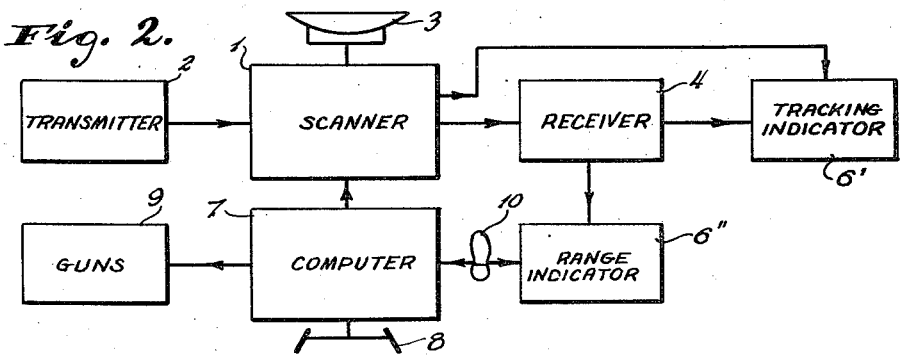
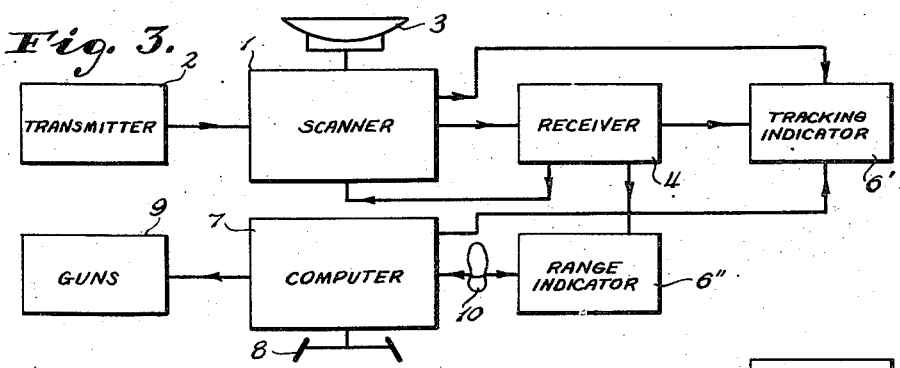
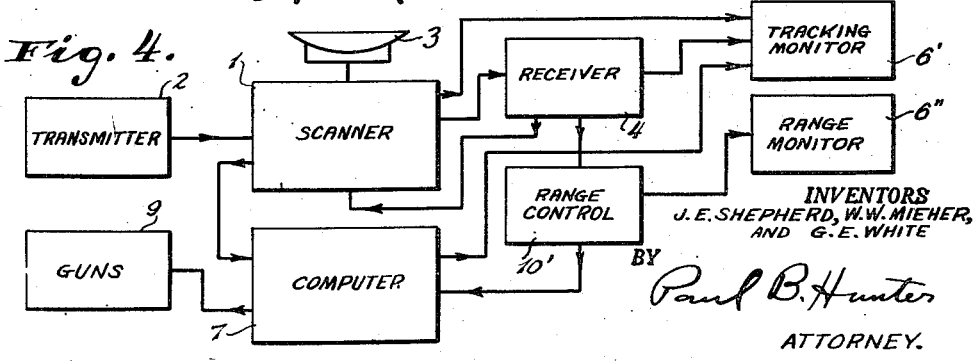

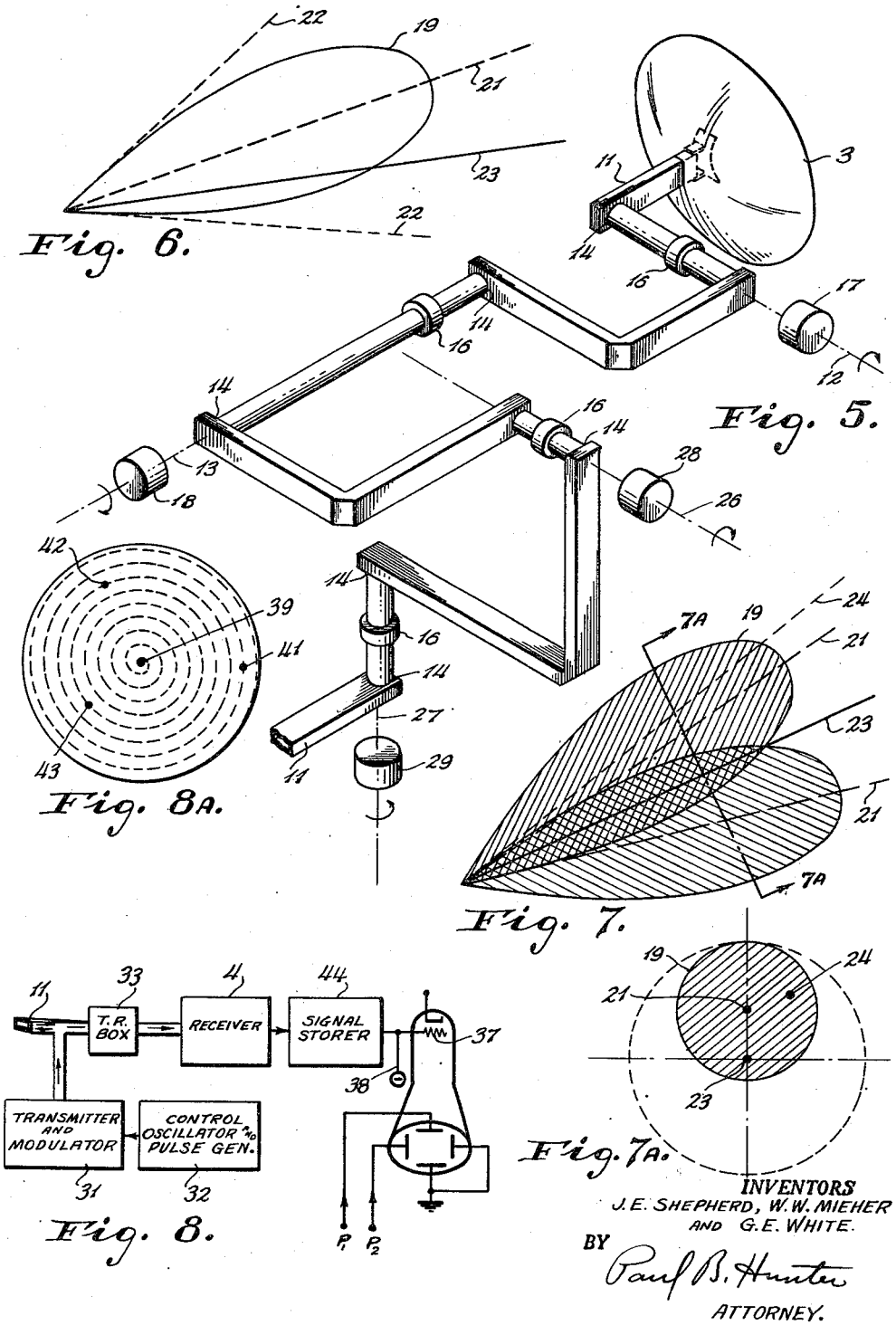

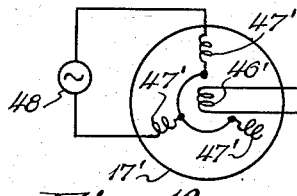
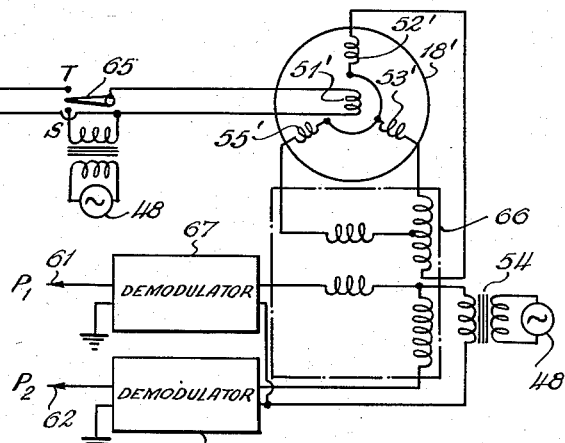
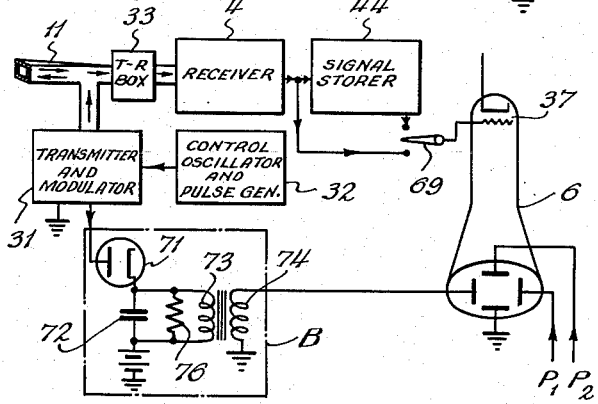
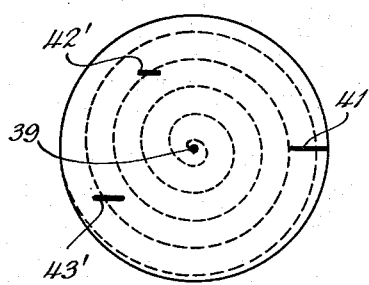
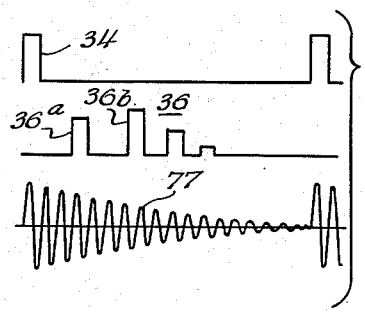
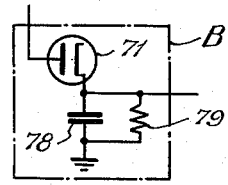
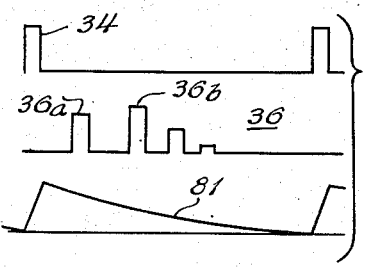
INVENTORS
J.E. SHEPHERD, W.W. MIEHER,
AND G.E. WHITE
BY
Paul B. Hunter
ATTORNEY.

United States Patent Office 2,710,399
Patented June 7, 1955

2,710,399

RADAR LOCATING APPARATUS

James E. Shepherd, Hempstead, and Walter W. Mieher, Mineola, N. Y., and Gifford E. White, Tarzana, Calif., assignors to The Sperry Corporation, a corporation of Delaware Original application April 30, 1942, Serial No. 441,188. Divided and this application March 11, 1948, Serial No. 14,256

16 Claims. (Cl. 343—11)

The present invention is concerned with radio-directed fire control systems especially adapted for use in aircraft and against other fast moving aircraft.

The present application is a divisional of copending application Serial No. 441,188, filed in the U. S. Patent Office on April 30, 1942, now U. S. Patent 2,617,982 issued November 11, 1952.

For the protection of large aircraft, such as heavy bombers, it is known to use flexible gun turrets movable independently of the craft in association with a computing gun sight or computer which is manually tracked with the target and thereby derives the proper gun aiming data for controlling the gun turrets. Up to the present time, however, such inter-aircraft fire control devices, and also anti-aircraft fire control devices, have relied upon visual tracking of the target for determining the correct gun aiming angles. Such prior art systems are subject to the well known limitations of visual sighting, such as reliance upon proper weather and visibility conditions, upon sufficient lighting, and upon the restricted range of optical telescopes. Even under optimum conditions of visibility, the visual detection of the approach of aircraft and visual tracking with aircraft have been difficult and uncertain. For instance, aircraft approaching from the direction of the sun can be seen only with the greatest difficulty. Furthermore, the observer cannot scan the whole zone of danger quickly and carefully with certainty by the eye alone.

In order to overcome these and other disadvantages of the prior systems, the invention of parent application Serial No. 441,188 provides a system in which the target is detected, located, and tracked by a radio beam which effectively replaces the visual line of sight of prior systems. However, before describing the present system, certain essential requirements for such a system will be discussed.

Firstly, the defending aircraft must be apprised of the presence and approximate direction or orientation of all targets in its vicinity in order to be able to effectively plan and accomplish its defense. In addition, it is desirable that the approximate range of each of these various targets should be indicated simultaneously with its location, for similar reasons. After having been warned of the presence, orientation, and range of these targets, and after having chosen one or more of them as of greater importance for immediate engagement, it is necessary for the particular target selected to be tracked by the fire control system in order to determine the target present position, such as defined by its elevation, azimuth, and range, in the present case, and to determine the rate of change of position, as defined by target elevation rate and azimuth rate, in order that the correct gun aiming angles for controlling the guns and turrets may be derived by the computer.

In order to relieve the fire control officer of as much of the burden of tracking as is reasonably possible, it is desirable to automatically track with the target, at least in elevation and azimuth, and possibly also in range, so as to automatically set into the computer mechanism the proper target position and target rate data.

The present system offers an improved type of warning or searching system for use in combination with several types of tracking or fire control systems. Preferably, since space and weight are at a premium in aircraft, these various systems are combined as much as possible to use a minimum amount of equipment.

Accordingly, by the present system there is provided apparatus for indicating the presence, approximate orientation, and approximate range of all targets within a predetermined portion of space, such as a hemisphere, which apparatus may be converted upon selection of a particular target, as shown in parent application Serial No. 441,188, into any one of three different types of tracking systems: (1) a system in which the fire control officer actuates the computer setting in such a manner as to maintain a radio line of sight in track with a target, (2) a system in which a radio line of sight is automatically tracked with a target and the fire control officer actuates a computer to maintain it in synchronism with the radio line of sight, and (3) a fully automatic system in which a radio line of sight is automatically maintained in synchronism with the target and serves to automatically set into the computer the proper target data required by the computer.

By such a system both the warning and tracking may be performed entirely independently of any optical visibility conditions and at a much greater range than was formerly possible, without impairing in any way any of the desirable features of former types of fire control systems.

In addition, the operation of the present system is made to agree in substantially all operations to be performed with the operation of prior systems and the natural instinctive reactions of the operator are utilized by the provision of controlling operations which are naturally dictated by the circumstances encountered.

Accordingly, it is an object of the present invention to provide improved gun control systems independent of visual devices.

It is another object of the present invention for providing improved radio-operated gun control systems.

It is still another object of the present invention to provide improved radio-directed gun control systems for detecting the presence of a target.

It is still another object of the present invention to provide improved object detecting and locating devices.

It is a further object of the present invention to provide improved warning systems adapted to indicate the presence, location and approximate range of distant objects.

Other objects and advantages of the present invention will become apparent from the following specification and drawings, in which, Fig. 1 shows a block or flow diagram of the system of the invention during searching operations.

Fig. 2 shows a corresponding block diagram of the system during manual tracking operations.

Fig. 3 shows a corresponding block diagram of the system during manual automatic operations.

Fig. 4 shows a block diagram of the system during full automatic operations.

Fig. 5 shows a schematic perspective view of one form of scanner useful in the present system.

Fig. 6 shows the radiation pattern of the directive antenna array used with the scanner of Fig. 5.

Fig. 7 shows a longitudinal cross-sectional view of the radiation pattern of the scanner of Fig. 5 during any of the tracking operations.

Fig. 7A is a cross-section of Fig. 7 taken along lines 7A—7A thereof.

Fig. 8 shows a schematic block wiring diagram of one form of radio transmitting, receiving and indicator circuit for searching operations.

Fig. 8A shows a representative view of the cathode ray screen of the indicator of Fig. 8.

Fig. 9 shows a schematic circuit diagram of the spiral sweep or reference voltage generating apparatus for the circuit of Fig. 8.

Figs. 10A, 10B, 10C, and 10D are voltage-time graphs useful in explaining the operation of the circuit of Fig. 9.

Fig. 11 shows a modification of a portion of the circuit of Fig. 9 to the right of line A—A thereof.

Fig. 12 shows a further modification of the spiral sweep or reference voltage generating apparatus of Fig. 9.

Fig. 13 shows a modification of the circuit of Fig. 8, including simultaneous range indicating means.

Fig. 13A shows a representative view of the cathode ray screen of the indicator of Fig. 13.

Fig. 14 shows voltage-time graphs of various portions of the circuit of Fig. 13.

Fig. 15 shows a modification of the portion of the circuit of Fig. 13 within dotted enclosure B.

Fig. 16 shows corresponding voltage-time graphs referring to the circuit of Fig. 15.

Although we have herein described our invention in connection with a gun control system and particularly in connection with a more comprehensive system, more fully described in parent application Serial No. 441,188, it is to be understood that our present invention is not necessarily limited to such use but may be employed in other indicating systems involving different parameters.

As discussed above the system to which the present invention relates is adapted for two major types of operation, namely, (1) that of the present invention—a searching operation for roughly indicating the position and/or distance of any targets within the field of operations of the device and (2) a tracking operation in which a particular target may be selected and followed by the device for properly directing a gun thereat. Three alternative types of tracking operation, known as "manual," "semi-automatic," and "full automatic" tracking may be used.

For describing generally these various types of operation, recourse is had to Figs. 1–4, more specific details of the system being described with respect to later figures.

Fig. 1 shows a block or flow diagram of the present system when operating during searching. In this system, a scanner 1 projects a sharply directive beam of radiant energy, such as 19 in Fig. 6, obtained as from a suitable transmitter 2 and directive antenna arrangement 3. This beam comprises a periodic sequence of short duration pulses of high frequency energy, and during searching is swept in a spiral cone over a predetermined solid angle, which is preferably substantially a hemisphere, in such manner that the radiant energy is projected at some time during its cycle into every part of the solid angle. Should any object or target be located in this solid angle, the projected radiant energy will be reflected therefrom when the beam is directed thereat, and will be received in the same antenna system 3, which acts dually as a transmitting and a receiving system.

This reflected series of pulses of high frequency energy is received in a radio receiver 4 whose output actuates a suitable indicator 6. This indicator, as will be described below more in detail, is preferably a cathode ray tube whose electron beam trace is caused to sweep in spirals in synchronism with and instantaneous correspondence with the spiral scanning motion of the scanner. For this purpose the indicator 6 is also controlled from scanner 1. The received reflected pulse is caused to momentarily brighten the trace of the beam and thereby produce on the cathode ray screen an indication of the existence and approximate orientation of the reflecting object. The approximate range of the reflecting object in accordance with the present invention is also shown, as described below with respect to Figs. 13–16.

The orientation of the scanner 1, which may be taken to be the orientation of the polar axis of the spiral conical scanning motion, is placed under the control of a computer 7, whose elevation and azimuth settings may be manually actuated from a suitable manual control 8. Computer 7 is adapted to calculate the proper gun aiming angles for intercepting the target by a projectile when the computer is set in accordance with the present target position data, such as elevation, azimuth and range of the target, and in accordance with the rate of change of the present target position, such as elevation rate and azimuth rate. A suitable form for such a computer is shown more in detail in copending application Serial No. 411,186, for Inter-aircraft Gun Sight and Computer, filed September 17, 1941, in the names of C. G. Holschuh and D. Fram, now abandoned. As is shown in this copending application, the range setting of computer 7 may be performed by a suitable foot pedal 10. The orientation control is effected by a handle bar control 8 whose displacement about two independent axes represents a combination of the displacement and rate of change of displacement of azimuth and elevation settings of computer 7, providing aided tracking. In operation, the controlling officer actuates control 8 so as to maintain the present target position setting of the computer 7 in track with the target, as evidenced (in the prior application) by a suitable optical sighting arrangement. By so doing, the proper target elevation, target azimuth, target elevation rate and target azimuth rate are set into the computing mechanism 7 together with the range data set in by foot pedal 10, whereby computer 7 may determine the gun aiming angles. In the present system, the same operations are performed, but utilizing a different type of indicator to show the proper tracking conditions, as will be described.

The scanner 1 is suitably controlled, as will be seen hereinafter, in accordance with the target elevation and target azimuth setting of computer 7. The gun aiming angles determined by computer 7 are used to suitably control the orientation of one or more guns or turrets 9, which are thereby rendered effective against the target.

A suitable type of gun control apparatus for orienting the guns 9 under the control of the computer 7 is shown in copending application Serial No. 424,612, for Hydraulic Remote Operating Systems, filed December 27, 1941, in the names of E. L. Dawson, F. M. Watkins and C. N. Schuh, Jr., now U. S. Patent 2,445,765, issued July 27, 1948. It is to be noted that the present system is not confined to the issue of this particular type of gun control apparatus, but that any other suitable type of remote control system may also be used. If desired, the guns 9 need not be directly controlled from computer 7 but may be locally controlled in accordance with suitable indications transmitted from computer 7 in any well known manner.

The system as shown in Fig. 1 is not intended for use as the actual gun control system but is merely intended to search out possible targets and to enable the scanner to properly locate a target for the purpose of later tracking with it. For this reason, the control from computer 7 to guns 9 is shown dotted in Fig. 1. After a target is observed on the screen of cathode ray indicator 6, the manual control 8 of computer 7 is actuated to adjust the orientation of scanner 1 to the position where this orientation coincides as closely as possible with the orientation of the desired target, as evidenced by the position of the bright spot indication on the indicator screen. When this adjustment has been made, the system is ready to change-over to the tracking operation.

The system is adapted to use three separate and distinct types of tracking, any one of which may be selected at the option of the fire control officer. It is to be noted that each of these types of tracking system may be used independently of the others if desirable. For all of these types of tracking operation, scanner 1 is energized from transmitter 2 by the same type of periodic pulse wave as described with respect to the searching operation. However, scanner 1 no longer performs spiral scanning as in Fig. 1 but instead it is converted to perform a narrow circular conical scanning with a very small apex angle. Preferably, this angle is of the order of the angular width of the radiation and reception pattern derived from antenna 3, indicated in Figs. 6, 7 and 7A.

Thus, if antenna system 3 is adapted to produce a beam of radiant energy having a directive radiation pattern such as 19 in Fig. 6 with a directivity axis 21 then, during tracking, beam 19 will be rotated by scanner 1 about an axis such as 23 in Fig. 7, whereby directivity axis 21 performs a conical motion about axis 23, which may be termed the tracking directivity axis since it is this axis which defines the radio line of sight, as will be seen. Preferably, radiation pattern 19 is made to have a small apex angle such as of the order of 4° in angular width between the half-power points. Then, during tracking, the cone described by axis 21 would preferably have an apex angle also of the order of 4°. In this manner, the useful portion of the radiant energy would be projected over a conical solid angle having an 8° apex angle. Energy reflected from an object or target within the field of this radiant energy will be received by antenna arrangement 3 and led thereby to receiver 4 whose output actuates the tracking indicator 6' to indicate the relative displacement between the scanner orientation defined by axis 23 and the orientation of the target.

In the system of Fig. 2, manual actuation of computer control 8 serves to set azimuth and elevation data into computer 7 and at the same time controls the orientation of scanner 1, as determined by axis 23, to assume the same azimuth and elevation as is set into computer 7, in the same manner as described with respect to Fig. 1. In effect, the orientation of scanner 1 is made the same as the orientation of computer 7, the latter term meaning the orientation corresponding to the azimuth and elevation data set into the computer mechanism.

Also actuated from receiver 4 is a range indicator 6''. A matching index is provided for indicator 6', as will be described more in detail below, which is placed under the control of range pedal 10 serving also to set range data into computer 7.

In operating the system of Fig. 2, the operator will, by his manual control 8, orient scanner 1 until the tracking indicator 6' shows that the target orientation coincides with the scanner orientation. At the same time, the operator actuates the range foot pedal 10 to match the range index to the indication produced by range indicator 6'. When these conditions obtain, and are maintained even during the motion of the target, the operator will know that the proper data is set into computer 7 and that the guns 9 controlled from the computed output of computer 7 are directed at the correct aiming angles to intercept the target with a projectile, and he may therefore, by a suitable firing key or control, fire at the target.

This system is known as "manual tracking" since the operator, through his manual control 8 and foot pedal 10, directly actuates the scanner and computer 7 to track with the target as evidenced by indicator 6' and 6''. The scanner 1, in effect, operates to produce a radio line of sight in the same way as the sighting telescope in a conventional anti-aircraft or interaircraft system operates to produce an optical line of sight, to enable the computer 7 to track with the present position of the target, whereby the proper gun aiming angles are determined.

A second type of tracking operation is illustrated in Fig. 3 and is termed "semi-automatic tracking". In this case the scanner 1, again performing circular conical scanning as described with rsepect to Fig. 2, is caused to automatically align its orientation with that of the target. This is done by using the reflected pulses received from the target to actuate suitable servo motors for orienting the scanner, which is thereby automatically oriented toward and tracks with the target. The computer 7 is again manually controlled from controls 8, in this instance to follow and track with the orientation of scanner 1. Thus, tracking indicator 6' in this type of system serves to indicate the displacement between the orientations of scanner 1 and computer 7, and computer 7 is actuated to maintain this "computer error" at zero. When this condition obtains, and with the proper computer range adjustment, similar to that described in Fig. 2, the output of computer 7, controlling guns 9, again represents the proper gun aiming angles and effective fire may be obtained from the guns.

Fig. 4 shows the third or "full automatic" tracking system in which no manual actuation is necessary. Here, scanner 1 is automatically oriented toward the target, under the control of the output of receiver 4, as in Fig. 3, and, in addition, the "orientation" of computer 7 is caused to automatically follow the position of scanner 1 by a suitable servo mechanism. In this manner, the proper target azimuth and elevation data are set into the computer 7. The range adjustment of computer 7 is also automatically performed by a range control 10' under the control of receiver 4. This system, however, does not obtain the target rates, that is, elevation rate and azimuth rate, in the same manner as in Figs. 2 and 3.

In the system of Fig. 4, it is necessary to determine elevation rate and azimuth rate by actually measuring the angular rate of motion of the azimuth and elevation input controls of scanner 1. This may be done in any well known way, such as is shown and described in U. S. Patent No. 2,206,875, for Fire Control Device issued July 9, 1940 in the name of E. W. Chafee et al. In this manner, all the required data may be set into computer 7 and therefore the guns 9 are automatically oriented at the proper gun aiming angles and automatically follow the target.

Indicator 6' in this instance merely serves as a monitor indicator to show how well the scanner 1 is following the target or, alternatively, how well the computer 7 is following and tracking with scanner 1. Indicator 6'' serves similarly as a range monitor indicator.

The system is therefore capable of four alternative modes of operation, namely, searching, manual tracking, semiautomatic tracking, and full automatic tracking.

Fig. 5 shows a schematic representation of one suitable type of scanner 1. Thus, the scanner 1 may comprise a directive antenna system 3, shown as comprising a parabolic wave guide reflector, and energized through suitable electromagnetic wave guide connections 11 from transmitter 2. A suitable construction for scanner 1 is shown and described in copending application Serial No. 438,388, for Scanning Devices, filed April 10, 1942 in the names of L. A. Maybarduk, W. W. Mieher, S. J. Zand and G. E. White, now U. S. Patent 2,410,831, issued November 12, 1946. As therein disclosed, the antenna arrangement 3 in one form may be continuously "nodded" or oscillated at a slow rate about nod axis 12 which is itself rapidly and continuously rotated or "spun" about spin axis 13 thereby producing a spiral conical scanning pattern by the continuous widening of the conical sweeping about spin axis 13. To convert from the spiral searching scanning to the circular tracking scanning, the nod motion about the nob axis 12 is interrupted, with the orientation of the directive radiation or receptivity pattern axis 21 displaced slightly from the spin axis 13.

In order to feed radiant energy from wave guide 11 to the radiator 3, suitable stationary joints 14 and rotating joints 16 are provided as described more in detail in the above-mentioned copending application Serial No. 438,388, and in copending application Serial No. 447,524 for High Frequency Apparatus, filed June 18, 1942 in the names of W. W. Mieher and J. Mallet, now U. S. Patent 2,407,318, issued September 10, 1946.

To provide the necessary control of tracking indicator 6' from scanner 1, in the manner to be described, suitable self-synchronous position transmitters are provided for producing signals indicative of the instantaneous position of the radiator 3 in nod and in spin, that is, indicative of the orientation of axis 21. The nod transmitter is indicated schematically at 17, the spin transmitter at 18. These transmitters may be of the well known "Selsyn," "Autosyn," or "Telegon" types.

Referring to Fig. 6, there is shown the radiation or receptivity pattern 19, of the antenna array 3 of Fig. 5. It will be noted that this radiation pattern 19 preferably is axially symmetrical about axis 21, and is substantially contained within a narrow solid cone 22, thereby forming a sharply directive beam of transmitted energy or a sharply directive reception pattern. Pattern 19 has been exaggerated for purposes of illustration, and preferably is very narrow, such as about 4° between the half-power points. During searching operations the axis 21 of this beam 19, by virtue of the combined effect of the nodding and spinning action of scanner 1, is caused to sweep out a spiral cone in space, the solid angle of this sweep being suitably chosen and ranging up to a complete hemisphere as desired. Preferably, the angular pitch of this spiral is chosen to be of the order of the effective angular width of the beam 19 whereby, during one complete spiral scan every portion of the conical solid angle will have had radiant energy projected to it, and radiant energy may be received from every such portion. The rates of nod and spin of the scanner of Fig. 5 are suitably chosen to provide a sufficiently short time interval for a complete scan, suitable for the purposes at hand.

During tracking operations the nod motion of scanner 1 is stopped at a position so that the axis 21 of maximum radiation or receptivity is displaced slightly from the spin axis 13 about which the radiation pattern 19 is rotated. In this way, as shown in Figs. 7 and 7A, energy of constant intensity is radiated or received along an axis 23 coincident with spin axis 13. However, along some other axis, such as 24, for example, maximum radiation and maximum receptivity is encountered only once during each spin cycle, resulting in a spin frequency modulation of waves received by reflection from an object oriented along axis 24.

The use of the same antenna arrangement for transmitting and receiving increases the sharpness of the resulting determinations since the over-all response pattern is the product of the radiation and receptivity patterns. If desired, however, a non-directional transmitter or receiver could be used with the described scanner acting respectively as a receiver or transmitter.

Conversion from searching to tracking scanning is effected, as described in application Serial No. 438,388, merely by energization of a suitable control solenoid. Other types of scanners are also described therein, requiring different apparatus for converting from searching to tracking, but all adapted to be used for searching or tracking in the same manner as the scanner of Fig. 5.

It may also be desirable to adjust the axis of this spiral scanning during the searching operation. For this purpose, scanner 1 may be provided with an elevation axis 26 and an azimuth axis 27 about which it may be suitably adjusted, in the manner described in application Serial No. 438,388, the control action being as described below. Also, suitable elevation and azimuth position transmitters 28 and 29 may be used, as will also be described below.

Fig. 8 shows one form of radio and indicator system for giving suitable indications during searching. Thus, assuming that the scanner of Fig. 5 is performing the spiral scanning described above, antenna array 3 is fed with radiant energy as over wave guide 11, from a transmitter and modulator unit 31. This transmitter 31 is adapted to produce high frequency radiant energy in any well known manner, and to modulate this high frequency energy by means of periodically recurring short duration pulses such as may be derived from a conventional control oscillator and pulse generator 32. There is thus radiated from the radiating arrangement 3 a sequence of short pulses of high frequency radiant energy. The frequency of control oscillator 32 and thereby the repetition frequency of the radiated pulses is chosen to have a suitably high value such that a substantial number of pulses is sent out during each spin rotation of the scanner 1 of Fig. 5. Suitable values for various constants of the circuits during this form of operation have been found to be the following: spin rotation, 1200 revolutions per minute; nod oscillation, 30 complete oscillations per minute; pulse repetition frequency, 2000 per second. With these values it will be seen that one complete cycle of spiral scanning will be accomplished each two seconds, one second being taken up in a spiral scan from zero nod to full nod, the other second of the cycle comprising the time for spiral scanning from full nod back to zero nod. During each half of the complete cycle 20 complete spin rotations are performed. Thus, for a full hemisphere of scan, the angular advance for each spin cycle will be approximately 4½ degrees, which is of the order of magnitude of the width of the radiation pattern 19 shown in Fig. 6. The pulse repetition rate of 2000 pulses per second gives 100 pulses per spin rotation, which thereby produces one pulse for each 3.6 degrees of motion of the radiation pattern 19 during scanning. Since the radiation pattern 19 is approximately 4 to 5 degrees wide, it will be seen that at least one pulse of radiant energy is transmitted to each point of the hemisphere.

Should a distant object be in the field of the system during radiation, at least one pulse will be incident thereon, and reflected therefrom. This reflected pulse or pulses will be picked up in the antenna arrangement 3 and conducted through wave guide 11 to the receiver unit 4 through a T-R box 33. T-R box 33 is adapted to pass the relatively low intensity received pulses but to block out the relatively high intensity transmitted pulses derived from transmitter 31. A suitable form for such a T-R box 33 is shown in copending application Serial No. 406,494 for Radio Apparatus for the Detection and Location of Objects, filed August 12, 1941, in the names of J. Lyman et al., and comprises, as is therein shown, an ionizable medium containing a spark gap within a resonant cavity which is resonant to the high frequency of transmission. The spark gap is so adjusted that the low intensity received waves are insufficient to create a discharge across the gap, whereas the high intensity transmitted pulses are sufficient to create such a discharge, which thereby ionizes the ionizable medium and effectively short circuits the wave guide 11 to these transmitted waves. In this manner the receiver unit 4 is effectively isolated from the high intensity transmitted pulses while being free to receive the pulses reflected from a distant object. Receiver unit 4 includes conventional preamplifying, detecting and wide-band amplifying units, all well known in the art, and is adapted to produce, in its output, signal currents or voltages corresponding to the wave shape of the envelope of the received reflected wave.

Referring to Fig. 14, the wave envelope of the radiated waves may be as shown at 34. The output of receiver unit 4 may then have the wave shape shown at 36. As there shown, a plurality of reflected pulses, 36a, 36b, etc. have been received corresponding to a plurality of reflecting objects located along the particular orientation of the radiation and reception pattern at the instant under consideration. These pulses are applied to the control grid 37 of the cathode ray tube indicator 6 shown in Fig. 8. Grid 37 is provided with a suitable bias, as by way of lead 38, such that, with no output from receiver 4, the cathode ray beam, produced by the usual means, is prevented from reaching the screen of the cathode ray tube indicator 6. However, this bias is also so adjusted that the received pulses 36 derived from the receiver unit 4 are permitted to momentarily render the electron beam trace visible on the screen of indicator 6. Thus, it will be clear that each time a reflected pulse is received a momentary bright spot or dot-like indication occurs on the cathode ray screen.

In order to give an indication of the orientation of the reflected object with respect to the location of the system of the invention it is desirable to produce a spiral scanning of the electron beam in synchronism with and corresponding instantaneously to the spiral scanning of the radiation and reception pattern 19. Suitable devices for obtaining deflecting voltages which will produce such a spiral scanning are shown in Figs. 9 through 12. Assuming, for the moment, that such spiral sweep voltages, designated as $P_1$ and $P_2$, have been obtained, these voltages $P_1$ and $P_2$, to be hereafter described more in detail, are impressed upon respective pairs of deflecting plates of the cathode ray indicator 6 and produce a spiral scanning of the electron beam such that at each instant the orientation of the latent trace of the beam on the screen of the cathode ray indicator 6 with respect to the screen center or pole 39 of Fig. 8A, corresponds to the instantaneous orientation of the beam axis 21 of antenna array 3 of scanner 1. Under these conditions the momentary brightening or intensifying of the electron beam under the control of receiver 4 will produce a momentary bright spot such as 41 shown in Fig. 8A. If a plurality of objects having different orientations are within the effective field of the searching system further bright spots such as 42 and 43 will also be produced, each having an orientation with respect to pole 39 respectively corresponding to the orientation of the corresponding reflecting object with respect to the spin axis 13 of the scanner 1.

As described above, the transmitted pulses and hence the reflected pulses are of quite short duration, such as the order of 1 microsecond. In order that the bright spots 41, 42 and 43 may be more clearly shown it is desirable to let the beam impinge upon the screen for a longer interval. For this purpose a signal storer 44 is inserted between receiver 4 and intensity control grid 37. This signal storer 44 may simply comprise a condenser-resistor network adapted to be instantaneously charged by a pulse derived from receiver 4 and which will maintain its charge beyond the duration of the pulse. However, the time constant of the signal storer 44 is preferably so chosen that this accumulated charge will be fully dissipated within a time not much longer than one recurrence period of the transmitted pulses in order that erroneous indications shall not be obtained. In this way the traces 41, 42, 43 are made brighter. In addition, the screen of indicator 6 is preferably made of high retentivity, so as to maintain its indication for a substantial interval after excitation is removed.

Fig. 9 shows one form of circuit for producing the spiral sweep voltages used with indicator 6 of Fig. 8. In this figure, nod transmitter 17 is indicated as being of a two-phase type having a single-phase energizing winding 46 and a two-phase secondary winding 47, in this instance connected in series to provide a single output. Winding 46 is energized from a suitable source 48 of alternating current. The output voltage appearing across the polyphase winding 47, namely voltage $V_1$ having wave shape as shown in Fig. 10A, will therefore be an alternating voltage having the frequency of source 48 and an amplitude varying in correspondence with the amount of nod, referred to the orientation of the scanner spin axis as zero nod. This wave is shown in Fig. 10A, being illustrated as having a linear change of amplitude with nod. It is to be noted that ordinarily this change of amplitude will be sinusoidal in character. However, by the use of proper motion converting devices whereby full nod motion corresponds to a small angular displacement of winding 46 with respect to winding 47, it may be made linear as illustrated. Preferably full nod is made to correspond to less than 45° rotation of transmitter 17, resulting thereby in substantially linear output as shown in Fig. 10A.

During searching operations, switch 49 will be connected to terminal S and hence the output voltage $V_1$ of nod transmitter 17 is fed to the single-phase winding 51 of the spin transmitter 18. The output from each of the two-phase windings 52 and 53 of spin transmitter 18 will then be the wave of Fig. 10A sinusoidally modulated in amplitude at the frequency of spin. This is shown in Fig. 10B for the winding 52. The winding 53, being displaced 90° in space with respect to winding 52, will have induced in it a voltage of similar wave shape but displaced 90° in phase at the spin frequency. In effect, spin transmitter 18 serves as a two-phase generator of spin frequency whose output amplitude is controlled by nod transmitter 17.

To each of these voltages output from windings 52 and 53 there is added a voltage of the frequency of source 48, as by way of transformer 54, producing the wave shown in Fig. 10C. It is to be noted that the wave of Fig. 10B represents in effect a suppressed-carrier modulated wave. The reinsertion of the carrier as by transformer 54 produces the usual modulated carrier wave shown in Fig. 10C. The resulting two waves are then rectified or detected in respective rectifiers 56 and 57 and filtered in filters 58 and 59 to produce the output voltages appearing on output leads 61 and 62 having the wave shape shown in Fig. 10D, namely, phase-displaced voltages of spin frequency modulated by the nod wave envelope.

These two voltages appearing on lines 61 and 62 will be phase displaced by 90° of the spin frequency. They will be termed the spiral sweep voltages $P_1$ and $P_2$, respectively. As is well known, if two voltages of equal amplitude and frequency, phase displaced by 90°, are impressed on the respective pairs of deflecting plates of a cathode ray tube, the resulting trace of the electron beam will be circular. By simultaneously varying the amplitudes of the two voltages the diameter of the circle will be varied.

In the present instance, by using the two waves $P_1$ and $P_2$ as the deflecting voltages, the beam will be caused to produce a circular pattern of constantly changing diameter and will thereby produce a spiral pattern similar to the pattern swept out in space by the scanner 1. It will, therefore, be clear that these voltages $P_1$ and $P_2$ are particularly suited for use in indicator 6.

During any of the three types of tracking, nod transmitter 17 is disconnected from spin transmitter 18 by switch 49, which then connects winding 51 of spin transmitter 18 to a fixed source of alternating voltage, such as source 48, as by way of lead 50. In this case, output sweep voltages $P_1$ and $P_2$ will have constant amplitude, producing a circular trace on indicator 6, and accordingly will be termed "circular sweep voltages."

Fig. 11 shows an alternative circuit for inserting the carrier and demodulating the waves produced by spin transmitter 18 to produce the sweep voltages $P_1$ and $P_2$. Thus, here the respective outputs of windings 52 and 53 are impressed upon the grids of respective detector or demodulator tubes 63 and 64 whose plate circuits are energized simultaneously from alternating voltage source 48. By properly phasing the anode voltage with respect to the grid voltages, and by filtering out all carrier frequency components, as in filters 58 and 59, the same type of spiral sweep voltages $P_1$ and $P_2$ will be obtained as in Fig. 9.

Fig. 12 shows a further modification of the spiral sweep voltage generating circuits of Figs. 9 and 11, particularly adapted for using conventional "autosyn" or "selsyn" devices. Thus, the nod transmitter 17' comprising, as is well known, a three-phase type winding 47' and a single-phase winding 46' relatively rotatable with respect to one another, has two of its polyphase field windings energized in series from the source 48 of alternating voltage the third winding remaining unenergized. In effect, therefore, there is produced in the single-phase winding 46' a varying alternating voltage similar to the voltage $V_1$ shown in Fig. 10A. It will be apparent that nod transmitter 17 of Fig. 9 and transmitter 17' of Fig. 12 are completely interchangeable, since, as used, they produce the same voltage output. This voltage derived in winding 46' is fed to the single-phase winding 51' of the "selsyn" type spin transmitter. There is thereby produced in the polyphase windings 52', 53' and 55' three voltages of the character shown in Fig. 10B, relatively displaced 120° with respect to one another and thereby forming a three-phase spiral sweep voltage. This three-phase voltage is converted into a two-phase voltage in a conventional "Scott T" transformer 66, which is well known in the art. The two-phase voltage output of transformer 66 is combined with a carrier voltage derived from source 48 by way of transformer 54, identical to that in Fig. 9 and the resulting voltages are each demodulated in respective demodulators 67 and 68 of any well known type, to produce the required sweep voltages $P_1$ and $P_2$ as before.

Here again means are provided for converting voltages $P_1$ and $P_2$ from spiral sweep voltages to circular sweep voltages. This means comprises switch 65 which connects winding 51' of spin transmitter 18' to nod transmitter 17' during searching, and to a fixed source 48 during tracking.

Fig. 13 shows a modification of the searching indicating circuit of Fig. 8, including a rough range indication. As in Fig. 8, control oscillator and pulse generator 32 controls transmitter and modulator unit 31 to produce periodic pulses of high frequency energy, which are then radiated from the scanner 1 of Fig. 5, performing spiral scanning as before. The wave envelope of the energy radiated may be as shown by curve 34 in Fig. 14.

Should any objects be present in the field of the radiating system, such distant objects would reflect pulses as before and the reflected pulses, having, for example, the wave shape such as at 36 in Fig. 14, would be received by the receiver 4 through the T–R box 33 and would control the intensity grid 37 of the cathode ray indicator as in Fig. 8. A switch 69 may be provided, in whose upper position a signal storer 44 similar to that in Fig. 8 is rendered effective, while in the lower position signal storer 44 is cut out of the circuit, and the pulses 34 directly control the intensity grid 37.

In order to provide a rough range indication, the transmitted pulses obtained from transmitter-modulator 31 are also fed to a suitable rectifier, such as a diode 71, and the rectified pulses thereby obtained serve to excite a resonant circuit comprising a condenser 72 and a suitable inductance 73. The resonant frequency of resonant circuit 72, 73 is made fairly high, such as of the order of three megacycles, and the output of resonant circuit 72, 73, as derived from a coil 74 coupled to inductance 73 is caused to be damped by means of a shunt resistor 76 connected in shunt with condenser 72 and inductance 73, or by the internal resistance of inductance 73.

As a result, the voltage derived in coil 74 will have some such wave shape as shown at 77 in Fig. 14. As there shown, the oscillatory wave 77 is damped so as to have substantially zero amplitude by the time the next transmitted pulse is derived, at which time a new train of highly damped oscillations is initiated. If desired, wave 77 could be even more highly damped to insure its dying out before the next transmitted pulse occurs. This damped oscillatory voltage 77 is connected in series with one of the pairs of deflecting plates of cathode ray tube 6. Both pairs of deflecting plates are also energized in accordance with the spiral sweep voltages $P_1$ and $P_2$ as in Fig. 8.

The result of this additional voltage 77 is to produce, instead of a bright spot such as 41, 42 or 43 of Fig. 8A, a definite line such as 41', 42' and 43' of Fig. 13A. The length of each of these lines depends upon the instantaneous amplitude of the wave 77 at the instant that the beam trace becomes visible, that is, at the instant that the received pulse such as 36a is received. It will be clear that the sooner pulse 36a is received after transmitted pulse 34 is emitted, the greater will be the instantaneous amplitude of wave 77 and therefore the longer will be the line segment indication such as 41'. Since the distance to the reflecting object is directly proportional to the delay time between transmitted and received pulses, it will be clear that the closer the reflecting object is to the transmitter, the longer will be the indication shown in Fig. 13A, and the more distant the reflecting object is the shorter will be the indication. There is thus provided a rough range indication superposed on the object detecting indication of Fig. 8A resulting in the indication represented by Fig. 13A, showing the orientation and rough range of several objects in the scanning field.

The indication of Fig. 13A will be obtained whether or not signal storer 44 is used in Fig. 13. However, it is preferable to insert signal storer 44 in the circuit in order to enhance the brightness and legibility of indication. The effect of signal storer 44 is to leave the electron beam on from the instant of reception of pulse 36a until substantially the next transmitted pulse. When such is the case, it will be clear that the indication will be in effect a bright spot or dot-like indication similar to 41 carrying fainter "wings" which form the complete indication shown at 41'. These "wings" are produced by the limits of the oscillating excursions of the beam caused by voltage 77, and their length is inversely proportional to the range of the distant object.

Fig. 15 shows a modification of the portion of the circuit of Fig. 13 contained within dotted enclosure B. As shown in Fig. 15, the output of demodulator 71 is now fed through a condenser 78 shunted by a resistor 79. The time constant of condenser 78 and resistor 79 is so chosen that the voltage accumulated on condenser 78 will persist for a substantial part of the period between consecutive transmitted pulses. This voltage may be as shown at 81 in Fig. 16.

With the modification of Fig. 15, signal storer 44 must be used. Thereupon, when a received pulse, such as 36a is produced, the electron beam causes a bright spot to appear on the screen of the indicator 6, which persists, due to action of signal storer 44. Due to the variation of the voltage 81, this bright spot will move horizontally, in the illustration shown, for a distance determined by the instantaneous amplitude of the voltage 81 at the instant the reflected pulse 36a is received, since the beam will be on all during the decay of voltage 81. The resulting indication will be as in Fig. 13A.

Accordingly, here again the length of the line segment indication will be inversely proportional to the reflection time and, accordingly, will indicate the proximity of the distant object.

It will be clear that in either or both Figs. 13 and 15, the "wing" voltage may be put on the vertical deflecting plates if desired, producing vertical line segment indications.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A range indicating system comprising means for radiating and receiving a pulse of wave energy, a cathode ray tube having an indicating screen, means responsive to an energy pulse reflected from an object for causing a dot-like indication to appear on the screen of said tube in a position thereon indicative of the direction of said object, and means for broadening said dot-like indication into a substantially straight line-like presentation having a length dependent upon the time interval between radiated and received pulses whereby said presentation will afford a measure of distance to said object.

2. A range indicating system comprising means for radiating and receiving a pulse of wave energy, a cathode ray tube having an indicating screen, means responsive to an energy pulse reflected from an object for causing a line to appear on the screen of said tube in a position thereon indicative of the azimuthal and elevational displacement of the direction of said object relative to said receiving means, and means for controlling the electron beam of said tube to render the length of said line inversely proportional to the time interval between radiated and received pulses.

3. A range indicating system comprising means for radiating and receiving pulses of wave energy, a cathode ray tube, means responsive to the reception of pulses reflected from an object for changing the intensity of the beam of said tube, and means including field-producing means controlled by said radiating means for applying a damped oscillatory deflection field to said tube following the transmission of each pulse having a frequency of the same order as the time duration of each pulse, said field-producing means being arranged relatively to said tube to cause linear oscillations of the beam of said tube for indicating the range of said object by the length of the line-like indication produced by said oscillations during the period of changed intensity of the tube.

4. A range indicating system comprising means for radiating and receiving pulses of wave energy, a cathode ray tube having an indicating screen, means responsive to the reception of pulses reflected from an object for changing the intensity of the beam of said tube to cause a line to appear on said screen, and means including field-producing means controlled by said radiating means for applying a damped oscillatory deflection field to said tube following the transmission of each pulse having a frequency of the same order as the time duration of each pulse, said field-producing means being arranged relative to said tube to cause linear oscillations of the beam of said tube whereby the length of the linear indication on said screen is a measure of the range of said object and of the magnitude of said oscillations during the period of changed intensity of the tube.

5. In an object detecting system, indicating apparatus comprising a cathode ray tube having an indicating screen, means responsive to the reception of energy reflected from an object for causing a dot-like trace to appear on the screen of said tube, means for deflecting the beam of said tube to radially position said trace from the electrical center of said tube in a direction and to an extent dependent upon the direction and magnitude of the resultant of two space coordinates of said object position relative to said detecting system, and means for oscillating the electron beam of said tube in a manner to extend said dot-like trace into a substantially straight line-like presentation having a length proportional to a measure of the magnitude of a third space coordinate of the object position.

6. In an object detecting system, indicating apparatus comprising a cathode ray tube having an indicating screen, means responsive to the reception of energy reflected from an object for causing a dot-like trace to appear on the screen of said tube, means for deflecting the beam of said tube to radially position said trace from the electrical center of said tube in a direction and to an extent dependent upon the direction and magnitude of the resultant of the angular orientation of said object along two-space coordinates relative to said detecting system, and means for broadening said trace into a substantially straight line-like presentation inversely proportional to the range of said object.

7. In an object detecting system having a directional instrument for scanning a portion of space, indicating apparatus comprising a cathode ray tube having an indicating screen, means responsive to the reception of energy reflected from an object for causing a dot-like trace to appear on the screen of said tube, means controlled by the scanning movements of said instrument for deflecting the beam of said tube to radially position said trace from the electrical center of said tube in a direction and to an extent dependent upon the direction and magnitude of the resultant of the orientation of said object along two space coordinates relative to said detecting system, and means for broadening the dot-like trace into a substantially straight line-like presentation having a length dependent upon the range of said object.

8. In an object detecting system having a directional instrument for scanning a portion of space, indicating apparatus comprising a cathode ray tube having an indicating screen, means responsive to the reception of energy reflected from an object for causing a dot-like trace to appear on the screen of said tube, means controlled by the scanning movements of said instrument for deflecting the beam of said tube to position said trace according to the azimuthal and elevational orientation of said object relative to said directional instrument, and means for broadening said dot-like trace into a straight line having a length inversely proportional to the range of the object.

9. In an object detecting system having a directional instrument for scanning a portion of space, indicating apparatus comprising a cathode ray tube having an indicating screen, means responsive to the reception of energy reflected from an object for causing a trace to appear on the screen of said tube, means controlled by the scanning movements of said instrument for deflecting the beam of said tube to position said trace according to the orientation of said object, means for periodically producing damped oscillations of the beam of said tube to produce a linear trace on the screen thereof, and means for correlating the time interval of said oscillations with the time occurrence of said energy whereby the amplitude of the oscillation in time agreement with the reception of said reflected energy is a measure of the range of said object.

10. A range indicating system comprising means for radiating and receiving pulse energy, a cathode ray tube having an indicating screen, means responsive to a pulse reflected from an object for causing the beam of said tube to produce a dot-like indication on the screen of said tube, and means for broadening said indication into a line having a length substantially inversely proportional to the time interval between radiated and received pulses.

11. A range indicating system comprising means for radiating and receiving pulse energy, a cathode ray tube having an indicating screen, means responsive to a pulse reflected from an object for causing the beam of said tube to produce a dot-like indication on the screen of said tube, means for producing a voltage varying in amplitude as a function of the time interval between transmitted and received reflected pulse energy, and means for broadening said dot-like indication into a substantially straight line-like presentation in accordance with the amplitude of said voltage at the time the reflected pulse is received.

12. A range indicating system comprising means for radiating and receiving pulse energy, a cathode ray tube having an indicating screen, means responsive to a pulse reflected from an object for causing the beam of said tube to produce a dot-like indication on the screen of said tube, means for producing an oscillatory voltage in timed relation to the transmitted pulse, the amplitude of the envelope of said voltage having a tapered wave form, and means for deflecting the beam of said tube in accordance with the amplitude of said voltage at the time of reception of the reflected pulse and in a manner to cause said dot-like indication to be broadened into a substantially straight line-like presentation, the length thereof being dependent upon the time interval between radiated and received pulses.

13. A radar locating system comprising a directional instrument for scanning a portion of space and including means for radiating and receiving pulse energy, indicating apparatus comprising a cathode ray tube having an indicating screen, means responsive to the reception of energy reflected from an object for causing the beam of said tube to produce a dot-like trace on the screen of said tube, means controlled by the scanning movements of said instrument for deflecting the beam of said tube to position said trace according to the orientation of said object, means for producing a voltage in timed relation to the transmitted pulse and decaying in amplitude, and means for applying said voltage at the time of arrival of the reflected pulse to said tube in a manner to produce a substantially straight, line-like extension of said dot-like trace, the length of said line-like extension being dependent upon the range of said object.

14. A radar locating system comprising a directional instrument for scanning a portion of space and including means for radiating and receiving pulse energy, indicating apparatus comprising a cathode ray tube having an indicating screen, means responsive to the reception of energy reflected from an object for causing the beam of said tube to produce a dot-like trace on the screen of said tube, means controlled by the scanning movements of said instrument for deflecting the beam of said tube to position said trace according to the orientation of said object, means for producing a voltage in timed relation to the transmitted pulse and decaying in amplitude, and means for applying said voltage at the time of reception of the reflected pulse to said tube in a manner to broaden said dot-like trace into a substantially straight line-like presentation.

15. A radar locating system comprising a directional instrument for scanning a portion of space and including means for radiating and receiving pulse energy, indicating apparatus comprising a cathode ray tube having an indicating screen, means for scanning the beam of said tube over the screen thereof along a path corresponding to the path of scan of said directional instrument in space, means controlled by energy reflected from an object for modulating the intensity of said beam whereby to produce a dot-like indication on the screen of the tube in a position thereon corresponding to the space orientation of an object relative to the directional instrument, means for producing a voltage varying in amplitude as a function of the time interval between transmitted and received reflected pulses, and means for deflecting the beam of said tube in accordance with said voltage at the time of reception of the reflected pulse and in a manner to broaden said dot-like indication into a substantially straight line-like presentation.

16. A radar locating system comprising a directional instrument for scanning a portion of space and including means for radiating and receiving pulse energy, indicating apparatus comprising a cathode ray tube having an indicating screen, means for scanning the beam of said tube over the screen thereof along a path corresponding to the path of scan of said directional instrument in space, means controlled by energy reflected from an object for modulating the intensity of said beam whereby to produce a dot-like indication on the screen of the tube in a position thereon corresponding to the space orientation of an object relative to the directional instrument, means for producing a voltage in timed relation to the transmitted pulse and substantially uniformly decaying in amplitude, and means for deflecting the beam of said tube to an amount corresponding to the amplitude of said voltage at the time of reception of the reflected pulse and in a manner to broaden said dot-like indication into a substantially straight line-like presentation.

References Cited in the file of this patent

UNITED STATES PATENTS

| | | |
|---|---|---|
| 2,405,238 | Seeley | Aug. 6, 1946 |
| 2,412,702 | Wolff | Dec. 17, 1946 |
| 2,423,104 | Labin | July 1, 1947 |
| 2,433,838 | Elie | Jan. 6, 1948 |
| 2,449,976 | Busignies | Sept. 28, 1948 |
| 2,468,032 | Busignies | Apr. 26, 1949 |
| 2,492,012 | Smith | Dec. 20, 1949 |
| 2,541,030 | Busignies | Feb. 13, 1951 |

FOREIGN PATENTS

| | | |
|---|---|---|
| 864,375 | France | Apr. 25, 1941 |